Dec. 12, 1967  J. G. FRANÇOIS  3,357,525
DISC-DRUM BRAKES
Filed May 2, 1966  6 Sheets-Sheet 2
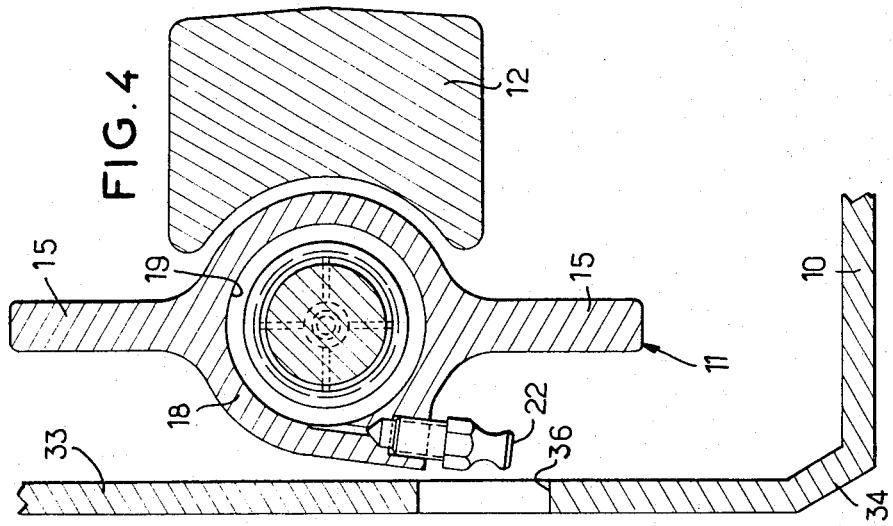
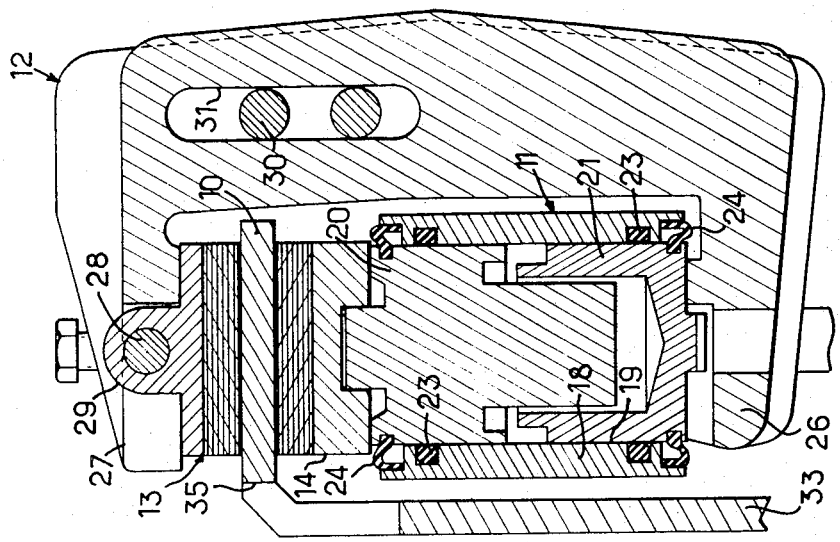
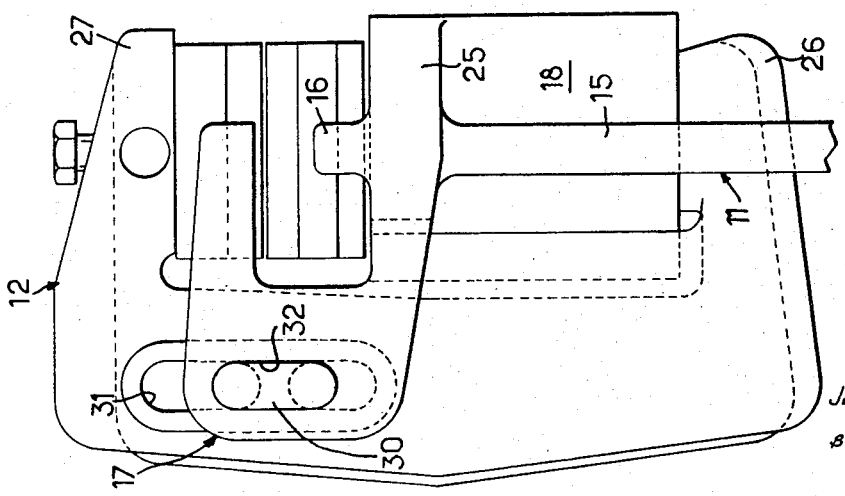
INVENTOR
JEAN GEORGES FRANÇOIS
BY Young & Thompson
ATTYS.

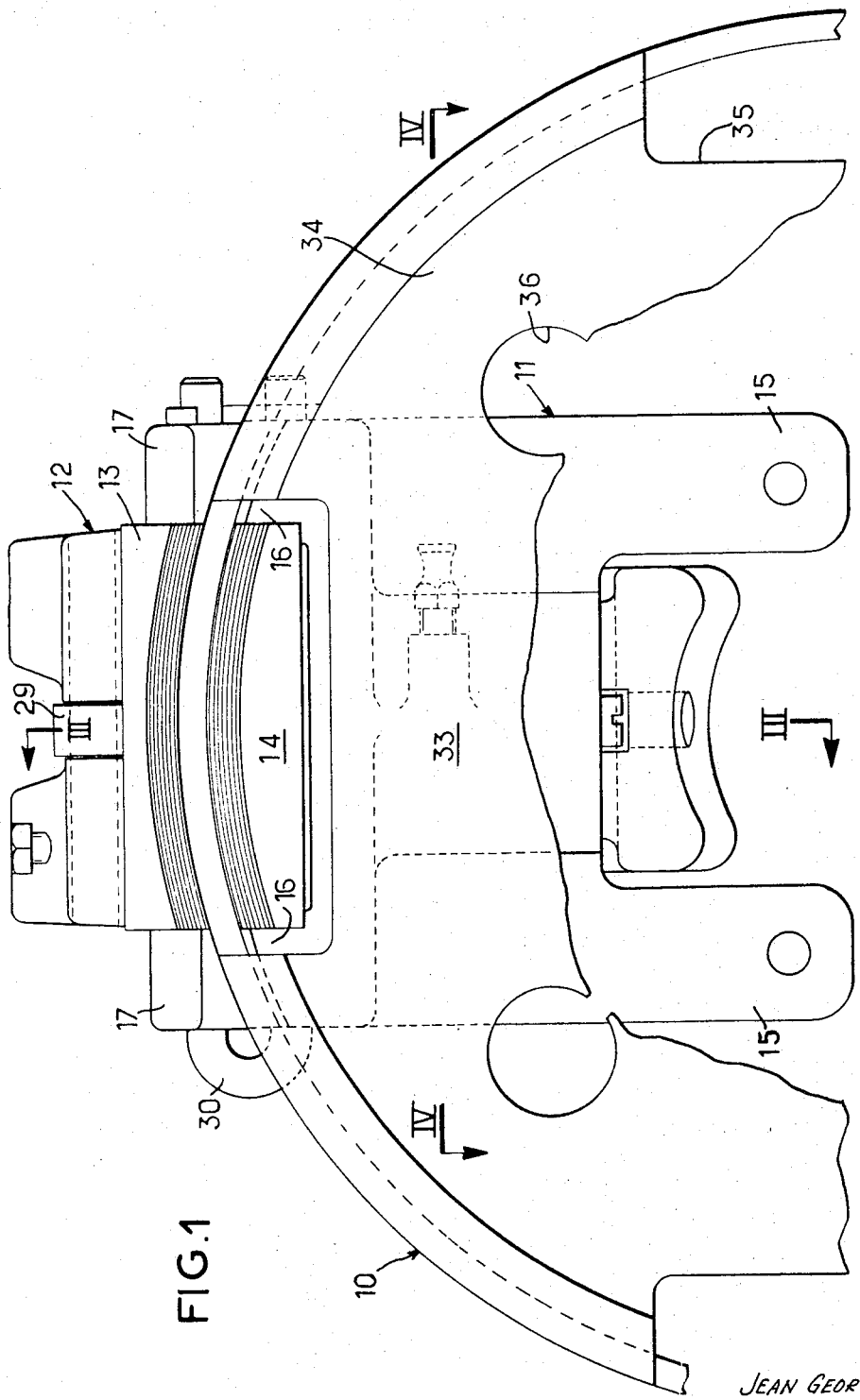

Dec. 12, 1967  J. G. FRANÇOIS  3,357,525
DISC-DRUM BRAKES
Filed May 2, 1966  6 Sheets-Sheet 3

INVENTOR
JEAN GEORGES FRANÇOIS
BY Young + Thompson
ATTYS.

Dec. 12, 1967  J. G. FRANÇOIS  3,357,525
DISC-DRUM BRAKES

Filed May 2, 1966  6 Sheets-Sheet 4

INVENTOR
JEAN GEORGES FRANCOIS
By Young & Thompson
ATTYS.

Dec. 12, 1967  J. G. FRANÇOIS  3,357,525
DISC-DRUM BRAKES

Filed May 2, 1966  6 Sheets-Sheet 6

INVENTOR
JEAN GEORGES FRANÇOIS
BY Young & Thompson
ATTYS.

United States Patent Office 3,357,525
Patented Dec. 12, 1967

3,357,525
DISC-DRUM BRAKES
Jean Georges François, Blanc-Mesnil, France, assignor to Societe Anonyme Francaise du Ferodo, Paris, France, a corporation of France
Filed May 2, 1966, Ser. No. 546,946
Claims priority, application France, May 6, 1965, 16,009; Nov. 12, 1965, 38,098
15 Claims. (Cl. 188—76)

ABSTRACT OF THE DISCLOSURE

A disc-drum brake has a brake drum, a pair of brake shoes disposed one on either side of the drum-braking surfaces, and a pressure fluid operated cylinder for causing the shoes to be applied against said surfaces. The cylinder is formed in a support fixed with respect to the drum, and the support is disposed with its medial plane in the axis along which the shoes apply a gripping force to the drum.

---

The present invention relates to disc-drum brakes, that is to say to brakes of the kind in which, for the braking of a wheel, a drum fixed to the said wheel is gripped between two brake shoes, and more particularly to those in which one of the shoes is subjected to the action of a piston slidably mounted in a cylinder, while the corresponding reaction is transmitted to the other shoe by a U-shaped member, between the arms of which the cylinder and the said shoes are disposed along the same so-called gripping axis.

The present invention has for its object various improvements made in brakes of this type.

In accordance with one of these improvements, the cylinder is arranged inside the drum, which makes it possible, for the same diametral dimensions of the assembly, to give the drum a radius greater than that which it is possible to give it when this cylinder is disposed outside the drum. In addition to the ease of construction which results, the quality and safety of the braking are thereby improved.

Following another of the improvements according to the invention, the said cylinder is formed in a support fixed on the journal of the wheel by two side legs, each symmetrical with each other with respect to the radial plane which contains the gripping axis, these legs enclosing one of the arms of the U-shaped member. As the support is preferably located in the axis of the zones of friction, there is no torsion stress to be absorbed.

In accordance with one form of construction, the drum being carried for its drive by an end portion perpendicular to its axis, it is coupled to this end portion by radial lugs uniformly distributed circularly and forming between them, at the periphery of the end portion, openings the dimensions of which are at least equal to those of the inner brake shoe. Access to this latter is thus very easy, especially for the purpose of its replacement; in addition, these openings assist advantageously in the ventilation of the internal space of the drum and the components which are mounted in this space.

Following another improvement in accordance with the invention, the U-shaped member is loosely mounted on the fixed support by the action of at least one assembly shaft established from one of its arms to the other, the said shaft or shafts each passing slidably through a bore drilled for that purpose in the fixed support.

In accordance with one form of construction, the assembly shaft or shafts are screw tie-rods passing through one of the arms of the U-shaped member and screwed into the other for bracing the said U-member parallel to the gripping axis. The rigidity of this member is thus advantageously reinforced along the axis in which it is required to absorb the braking control force.

In accordance with another of the improvements according to the invention, each brake shoe is provided laterally with as many lugs as there are assembly shafts, the lugs of one shoe being respectively superimposed on that or those corresponding to the other shoe, for mounting in pairs on a common shaft.

This arrangement renders the dismantling of the brake shoes particularly easy, for example with a view to their replacement. It is only necessary to withdraw the assembly shaft or shafts so that the assembly of the U-shaped member and the brake shoes is freed and can be removed from the drum.

According to a further aspect of the invention, the fixed support has the form of an H, the upper legs of which, that is to say the outermost with respect to the drum, enclose the brake shoes, and the said upper legs are cross-braced by an elongated strap in the direction of action of the braking torque. This strap may be fixed on the said support, or alternatively it may form an integral part of the support.

The present invention has also for its object an improvement according to which, each brake shoe being formed by a cylindrical friction lining fixed on a metal support, the said support is itself also cylindrical and for this reason has a constant thickness, which makes it possible for it to be produced economically from a metal sheet. In addition, account is taken of the inequality of wear of the outer shoe and the inner shoe. According to one form of construction, the lining of the outer shoe has a thickness greater than that of the inner shoe; in an alternative form, this lining is made of a more resistant material than that of the inner shoe.

According to a further improvement, the first piston bears on the associated shoe following a non-continuous supporting surface, this arrangement enabling the transmission to the cylinder of the heat evolved during the course of braking to be reduced to a substantial extent and in consequence, the tendency to vapour-lock is reduced.

The objects, characteristic features and advantages of the invention will further be brought out during the course of the description which follows below of one form of embodiment of the invention, given solely by way of non-limitative example, reference being made to the accompanying drawings, in which:

FIG. 1 is a view in elevation of a brake according to the invention;

FIG. 2 is a left-hand view of this brake, from which the drum has been removed;

FIG. 3 is a view in cross-section taken along the line III—III of FIG. 1;

FIG. 4 is a view in cross-section taken along the line IV—IV of FIG. 1;

Figure 5:
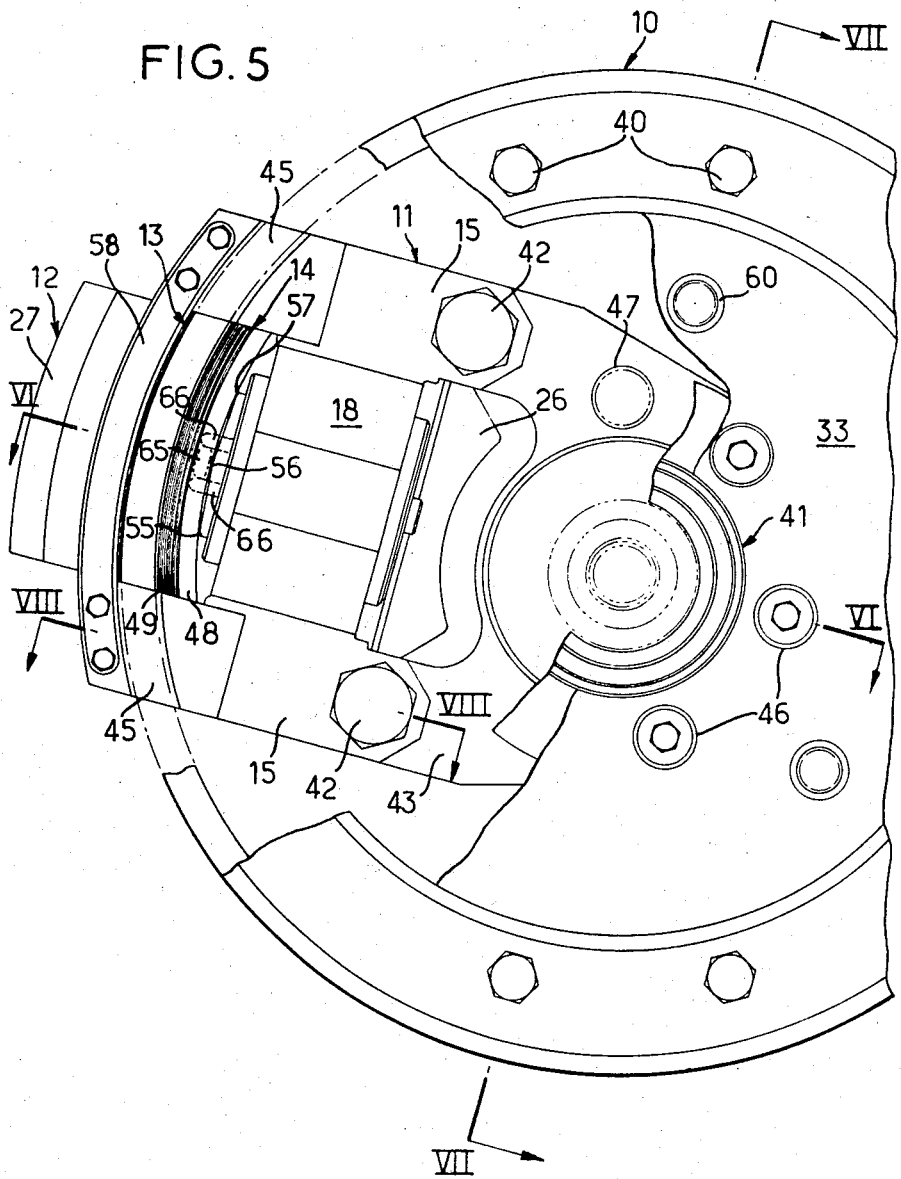
FIG. 5 is a partial view in elevation of an alternative form of construction of the barke according to the invention, with parts broken away.
Figure 8:
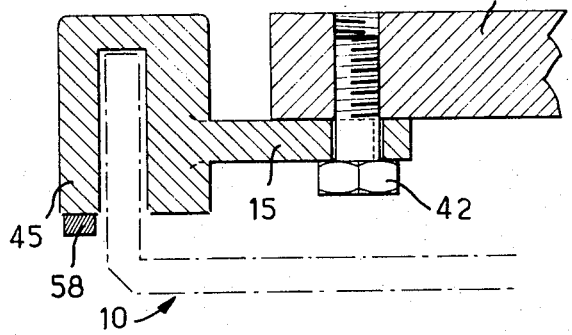
FIG. 8 is a further partial section of this alternative, taken along the line VIII—VIII of FIG. 5.
Figure 6:
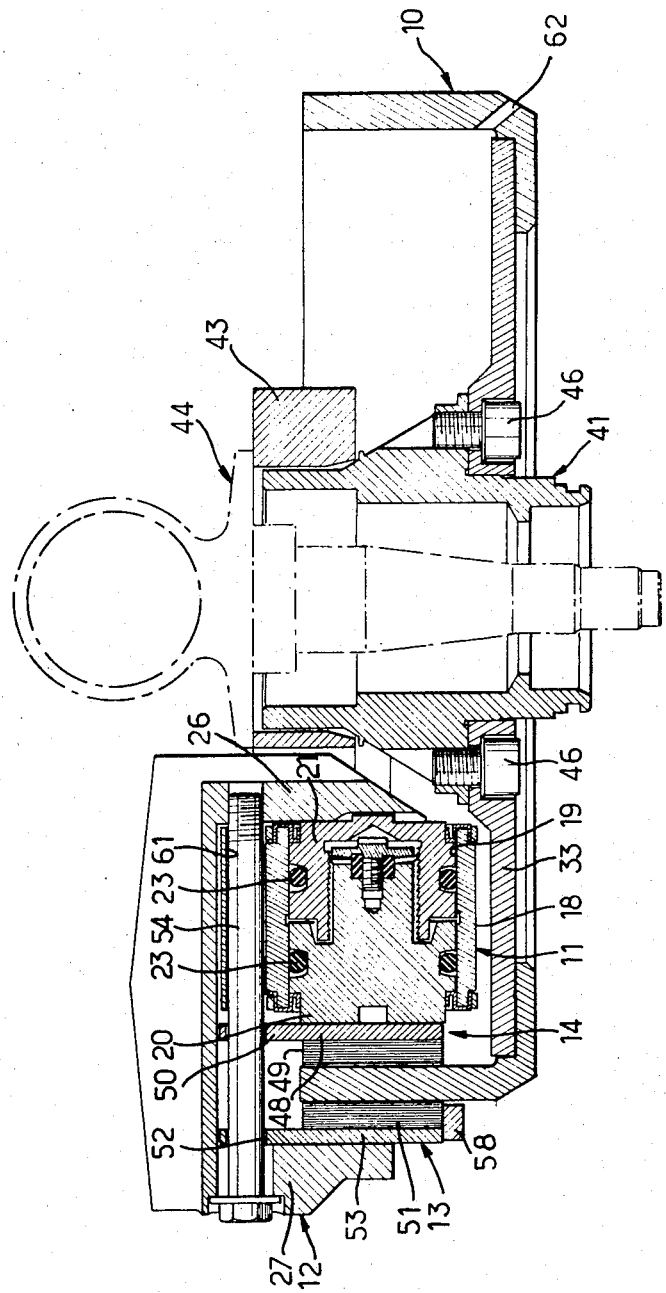
FIG. 6 is an axial section of this alternative form, taken along the line VI—VI of FIG. 5.

In accordance with the form of construction chosen and shown in FIGS. 1 to 4, the brake according to the invention comprises essentially a drum 10, a support 11, a U-shaped member or stirrup 12 and two brake shoes 13 and 14 which grip the drum 10.

The support 11 has the form of an H, the lower legs 15 of which serve for fixing this support on the journal of the wheel to be braked. Beyond a horizontal rib 25, the upper legs 16 ensure conjointly the lateral guiding of the lower shoe 14. The rib 25 is further extended by two lateral returns 17 which pass round the drum 10 so as to ensure conjointly the laterally guiding of the upper brake 13.

In the central body 18 of the support 11 is formed a cylinder 19, in which an upper piston 20 and a lower piston 21 are slidably mounted under the control of fluid under pressure delivered through a nozzle 22 into the central zone of the cylinder 19. Fluid-tightness is ensured by ring joints 23, and protection by flexible joints 24.

The upper piston 20 acts directly and positively on the lower brake shoe 14, the maintenance of which it also ensures, while the lower piston 21 bears against one of the arms 26 of the U-shaped member 12, which arm is arranged between the legs 15 of the support 11, immediately below the body 18 of this support, in the gripping axis along which the pistons 20 and 21 and the shoes 13 and 14 are arranged. The other arm 27 of the U-shaped member parallel to the arm 26, carries the upper shoe by means of a shaft 28 which passes through this arm and a lug 29 of the shoe 13.

The U-shaped member 12 is mounted floating with respect to the drum 10, but is guided by the support 11 through the intermediary of a round U-shaped rod 30 engaged on the one hand in a slot 31 of the U member 12 and on the other hand in slots 32 formed in the return members 17 of the support 11.

The drum 10 is carried by an end-piece 33 perpendicular to its axis, and is coupled to this end-piece by a set of webs 34, uniformly distributed around the circular periphery of the part 33, the said webs 34 forming between each other in pairs, ventilation openings 35, the dimensions of which are sufficient to provide access to the lower brake-shoe 14, in particular for the purpose of its replacement. The end-piece 33 is further provided with openings 36 providing access to the nozzle 22.

The operation of a brake of this kind is well known. When a fluid under pressure is introduced between the two pistons 20 and 21, the latter move away from each other, the piston 20 applying the shoe 14 forcibly against the drum 10 and the corresponding reaction being transmitted to the shoe 13 by the U-shaped member 12, which ensures the braking of the drum 10 by gripping between the two shoes. This braking action ceases as soon as the pressure of the control fluid is released.

In FIGS. 5 to 9 which relate to an alternative form of construction, there is again seen at 10 a drum gripped between an outer braking shoe 13 and an inner braking shoe 14 mounted between the arms of a U-shaped member 12. This drum 10 is fixed by screws 40 on a disc 33 which is in turn fixed by screws 46 to the hub 41 of the wheel to be braked.

There is also seen at 11 the H-shaped support, the lower legs 15 of which, that is to say the innermost with respect to the drum 10, are screwed at 42 on a fork 43 which is in turn fixed by screws 47 to the journal 44 of the wheel. As previously, the upper legs 45 of the support, that is to say the outermost with respect to the drum 10, pass round this latter so as to ensure conjointly the guiding and also the front and rear abutment of the shoes 13 and 14.

In the central body 18 of the support 11 is formed a cylinder 19, in which a first piston 20 and a second piston 21 are slidably mounted under the control of a fluid under pressure, the supply inlet of which has not been shown. The fluid-tight joints 23 are arranged in grooves formed in the pistons and not in the cylinder, which enables the diametral dimension of the unit to be reduced.

The U-shaped member 12 is mounted floating on the support 11 by means of a single assembly shaft 54 which passes slidably through the support 11 in a bore 61. This shaft 54 is a screw tie-rod which passes through the outer arm 27 of the U member 12 and is screwed into the inner arm 26 of this latter, which is thus advantageously cross-braced in the plane which contains the gripping axis, that is to say the axis along which the gripping force is developed.

The inner shoe 14 is formed in a manner known per se by a metal support 48 and a friction lining 49. According to the invention, the support 48 is of constant thickness, which has the advantage that it can be produced from a simple metal sheet, and is extended laterally by a rod 50.

The outer shoe 13 is of similar construction, but in order to take account of the wear of this shoe, which tests have shown to be greater than that of the inner shoe, its lining 51 is of greater thickness than that of this latter; in addition, the lug 52 of its metal support 53 is superimposed radially on that of the shoe 14, which permits of a common assembly on the assembly shaft 54.

This shaft 54 passes through the lugs 50 and 52 with a peripheral clearance, which is just sufficient to permit the sliding assembly of the shoes 13 and 14 on the shaft 54, together with the abutment of these latter by the legs 45 of the support 11 in order to absorb the driving torque. In an alternative form, the brake shoes are provided with oblong lugs in the direction of the drive, so as to permit a slight relative movement of the shoes in this direction. The shaft 54 also passes through the support.

It will be noted that, since the shoes 13 and 14 are in abutment at the front and the rear against the support 11, in accordance with the form of embodiment shown, the assembly shaft 54 does not withstand any driving force during braking.

It will also be observed that the first piston 20 bears against the inner shoe 14 by three separate lines of support 55, 56 and 57; such a non-continuous supporting surfaces enables the tendency to vapour-lock to be substantially reduced.

The upper legs 45 of the support 11 are also preferably cross-braced by an elongated strap 58 with its length in the direction of the braking torque.

For reasons of space occupied and assembly, provision has been made for fixing the disc 33 to the wheel disc 59 by screws 60, along a diameter less than that comprising the screws 40 of the drum 10. For similar reasons, the brake has been arranged at the rear of the wheel along an axis inclined by about +15° to +20° to the horizontal but it is of course possible to arrange it with a negative inclination to the horizontal.

The operation of a brake of this kind is in all respects similar to that of the brake described previously. However, in this case, the simplicity of the assembly makes replacement of the brake shoes particularly easy. It is only necessary to remove the assembly shaft 54 in order to liberate the U-shaped member 12 and the shoes 13 and 14 towards the rear. It is therefore not necessary to provide openings for this purpose in the drum, or to dimension in consequence any openings that may be provided for ventilation. In the form of construction shown, the only provision has been for the evacuation of dust by the holes 62.

In an alternative form, the bracing strap 58 may form an integral part of the support 11. Also, the first piston 20 may be applied on the inner brake shoe 14 by two flat bearing surfaces formed by machining the support 48 on each side of a zone which remains cylindrical, or by any other arrangement which preferably ensures discontinuity of the supporting surface.

As regards the abutment of the shoes against the fixed support 11 in the direction of forward running, it may be advantageous, especially in the case of longer shoes, to make this abutment inclined preferably towards the rear with respect to the plane of symmetry of the shoe which passes through the axis by bringing closer to this plane the edge of the shoe nearest the axis, with a view to overcoming the phenomena of lifting at the front and self-application. It is also possible to replace the front abutment and the rear abutment of at least one of the brake shoes by a central abutment on each side of the shoe. An arrangement of this kind has been shown diagrammatically in broken lines in FIG. 5, in which two studs 55, carried laterally by the support 48 of the inner shoe 14, are interposed between radial fingers 66 carried by the cylinder 19 on each side of this latter. This arrangement can naturally be applied to the two shoes or alternatively it may be limited to only one of the front or rear abutments of the shoes, a single set of fingers 66 being then necessary.

Furthermore, in order to take into account the conicity effect on the drum while hot, together with the opening of the jaws of the stirrup during braking, it may be advantageous to prevent the effects of the phenomena on the wear of the shoes, tests having shown that this wear does not take place uniformly along a generator line of the drum, by giving the jaws of the stirrup 12 a slight convergence comprised between 0′ and 45′ for example, and preferably between 30′ and 45′.

Figure 7:
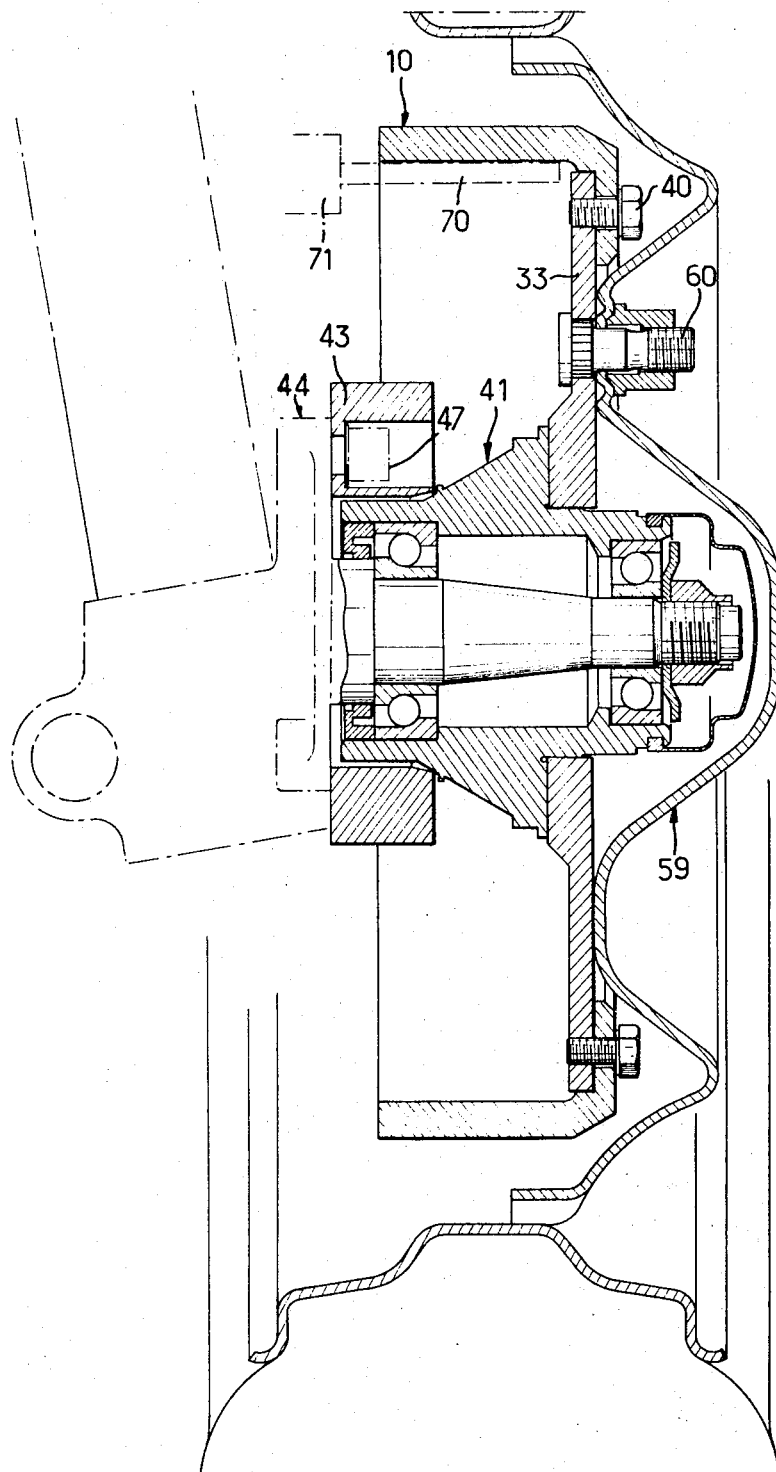
FIG. 7 is another axial section of this alternative, taken along the line VII—VII of FIG. 5, perpendicular to that preceding.
Figure 9:
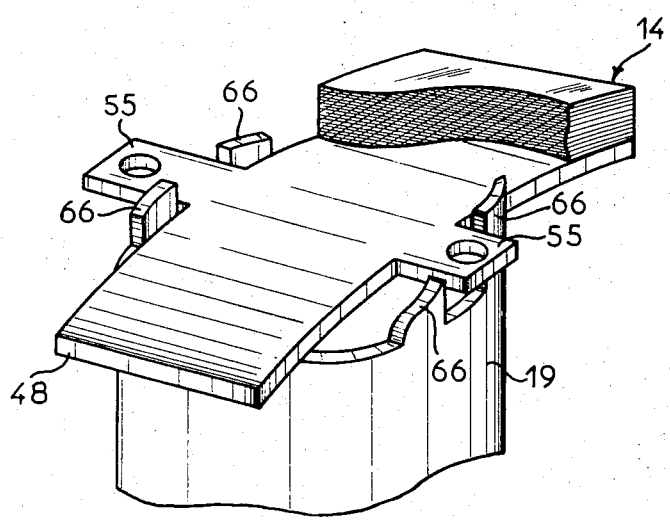
FIG. 9 is a fragmentary perspective view of a portion of the embodiment of FIG. 5.

According to another aspect of the invention shown diagrammatically in chain-dotted lines in FIG. 7, provision has been made for arranging in contact with the internal braking track of the drum 10, a brush 70 elongated along a generator line of the drum and suitably prevented from rotation by a fixed support 71, the said brush 70 having the purpose of cleaning this braking track, removing water and dirt which may have adhered to it. According to a preferred form of construction, the brush 70 is a rod of flexible synthetic material, such as polyvinyl chloride, comprising a magnetic filler. The corresponding magnetic attraction must obviously be necessary and sufficient to ensure the application of the brush 70 against the drum. Naturally, a number of brushes may be provided for the same track, and a similar arrangement may equally well be provided on the other braking track. It will furthermore be noted that this sweeping arrangement may be provided on any braking surface or track, on a disc for example.

The present invention is of course not limited to the forms of embodiment described and/or shown, but includes all alternative forms of construction, especially as regards the number and the arrangement of the tangential lugs of the brake shoes, and of the associated assembly shafts. It may also be advantageous to interpose between the shoes and their respective supports, any means such as a swivel joint, permitting the shoes to be precisely applied against the drum by a relative play with respect to these supports.

What I claim is:

1. A disc-drum brake comprising a drum, two brake shoes disposed one on either side of the drum, a control cylinder disposed within the drum, a first piston slidably mounted in the cylinder for urging one of said shoes against the drum, a C-shaped stirrup member floatingly mounted with respect to said drum, a second piston slidably mounted in the cylinder to urge the C-shaped member in the opposite direction to the first piston, said cylinder and said brake shoes being disposed within the C-shaped member along the axis along which the gripping action of the shoes takes place, said second piston acting on one end of said stirrup member, the latter transmitting the action of the second piston to the other of said brake shoes, characterized by a fixed support in the form of an H having for its plane of symmetry the radial plane containing said gripping axis, said cylinder being formed in said support, said support having two lower arms for fixing the support, said arms having, at right angles to the axis of the disc-drum, a common medial plane containing said gripping axis, the central bar of said H-shaped support being formed by said cylinder, the two upper arms of said H-shaped support being disposed one to either side of the C-shaped member and the brake shoes.

2. A disc-drum brake according to claim 1, and a guide coupling member connecting the C-shaped member and the support and disposed parallel to the radial plane containing the gripping axis.

3. A disc-drum brake according to claim 1, said upper arms of the support laterally guiding the brake shoes.

4. A disc-drum brake according to claim 1, and at least one assembly shaft connecting the two arms of the C-shaped member, said shaft passing through a hole formed in the support so as to leave clearance between the shaft and the hole.

5. A disc-drum brake according to claim 4, said at least one assembly shaft being a tie rod passing through one arm of the C-shaped member and screwed into the other for bracing the C-shaped member parallel to the gripping axis.

6. A disc-drum brake according to claim 5, each brake shoe having as many lateral lugs as there are assembly shafts, the lugs of one shoe being respectively superposed on the corresponding lugs of the other shoe and mounted in pairs on a common said assembly shaft.

7. A disc-drum brake according to claim 6, said shafts passing through the lugs with a slight clearance.

8. A disc-drum brake according to claim 6, said lugs having holes elongated in the direction of driving.

9. A disc-drum brake according to claim 6, each brake shoe comprising a cylindrical brake lining secured to a cylindrical metal support having a constant thickness, the associated said lugs being formed by extensions of the said support.

10. A disc-drum brake according to claim 1, and a bar elongated in the direction of driving and bracing the upper arms of the support.

11. A disc-drum brake according to claim 1, said first piston acting on the associated shoe over a discontinuous supporting surface.

12. A disc-drum brake according to claim 3, said upper arms of the fixed support forming an inclined abutment surface for at least the front portions of the shoes.

13. A disc-drum brake according to claim 1, at least one of the brake shoes having at least one lateral stud carried by the shoe at its central zone and abutting at least one radial finger fast with said fixed support.

14. A disc-drum brake according to claim 1, the arms of the C-shaped member converging at an angle up to 45′.

15. A disc-drum brake according to claim 14, said angle being about 30° to 40°.

References Cited

UNITED STATES PATENTS

| | | | |
|---|---|---|---|
| 2,949,173 | 8/1960 | Peras | 188—73 X |
| 3,052,327 | 9/1962 | Yazell | 188—76 |
| 3,295,636 | 1/1967 | Adams | 188—76 X |

FOREIGN PATENTS

| | | |
|---|---|---|
| 227,747 | 4/1960 | Australia. |
| 968,898 | 9/1964 | Great Britain. |

DUANE A. REGER, *Primary Examiner.*